(12) United States Patent
Koo

(10) Patent No.: US 10,019,068 B2
(45) Date of Patent: Jul. 10, 2018

(54) HOME DEVICE CONTROL APPARATUS AND CONTROL METHOD USING WEARABLE DEVICE

(71) Applicant: Samsung Electronics Co., Ltd., Suwon-si, Gyeonggi-do (KR)

(72) Inventor: Bon-Hyun Koo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/109,357

(22) PCT Filed: Jan. 6, 2015

(86) PCT No.: PCT/KR2015/000101
§ 371 (c)(1),
(2) Date: Jun. 30, 2016

(87) PCT Pub. No.: WO2015/102467
PCT Pub. Date: Jul. 9, 2015

(65) Prior Publication Data
US 2016/0320849 A1    Nov. 3, 2016

(30) Foreign Application Priority Data

Jan. 6, 2014 (KR) .................. 10-2014-0001567
Nov. 3, 2014 (KR) .................. 10-2014-0151603

(51) Int. Cl.
G06F 3/01        (2006.01)
H04L 12/28       (2006.01)
G06F 3/0484      (2013.01)
G06F 3/0488      (2013.01)
(Continued)

(52) U.S. Cl.
CPC ............. *G06F 3/017* (2013.01); *G06F 3/01* (2013.01); *G06F 3/0346* (2013.01); *G06F 3/0488* (2013.01); *G06F 3/04847* (2013.01); *G10L 17/22* (2013.01); *H04L 12/282* (2013.01); *H04L 2012/285* (2013.01)

(58) Field of Classification Search
CPC ........ G06F 3/017; G10L 17/22; H04L 12/282
USPC ...................................................... 340/12.2
See application file for complete search history.

(56) References Cited

U.S. PATENT DOCUMENTS 6,515,669 B1      2/2003   Mohri
2011/0304541 A1*  12/2011  Dalal ................. G06F 3/017
                                               345/158
2012/0127072 A1    5/2012   Kim
(Continued)

FOREIGN PATENT DOCUMENTS

KR    10-2012-0054743 A    5/2012
KR    10-2012-0064923 A    6/2012
(Continued)

OTHER PUBLICATIONS

Zhang et al., PCA & HMM Based Arm Gesture Recognition Using Inertial Measurement Unit, XP055301917, Sep. 30, 2013.
(Continued)

*Primary Examiner* — Vernal Brown
(74) *Attorney, Agent, or Firm* — Jefferson IP Law, LLP

(57) ABSTRACT

A method for controlling a home device is provided. More specifically, a method of utilizing a user interface, a method of utilizing a voice, and a method of utilizing a gesture such as a wrist snap utilizing a wearable device is provided.

12 Claims, 15 Drawing Sheets

(51) Int. Cl.
*G10L 17/22* (2013.01)
*G06F 3/0346* (2013.01)

(56) References Cited

U.S. PATENT DOCUMENTS

| | | |
|---|---|---|
| 2012/0221177 A1 | 8/2012 | Shin et al. |
| 2012/0330387 A1 | 12/2012 | Ferraz Rigo et al. |
| 2013/0204408 A1 | 8/2013 | Thiruvengada et al. |
| 2015/0036573 A1* | 2/2015 | Malik ............... H04W 52/0254 370/311 |
| 2015/0355719 A1* | 12/2015 | Suman .................... G06F 3/014 345/156 |

FOREIGN PATENT DOCUMENTS

| | | |
|---|---|---|
| KR | 10-2012-0111330 A | 10/2012 |
| WO | 2006-068357 A1 | 6/2006 |
| WO | 2012/172487 A1 | 12/2012 |

OTHER PUBLICATIONS

Morganti et al., A smart watch with embedded sensors to recognize objects, grasps and forearm gestures, XP055162505, Jan. 1, 2012.
Sung-Jung Cho et al Two-stage Recognition of Raw Acceleration Signals for 3-D Gesture-Understanding Cell Phones, La Baule (France) Publication Date Oct. 23, 2006 XP055416164.

* cited by examiner

```
JSON Message : Gear To Mobile
{
    "CMD_ID": 2,
    "DEV_LIST": [
      {
          "DeviceId": "ID_LED"
      },
      {
          "DeviceId": "ID_DOORLOCK"
      },
      {
          "DeviceId": "ID_SMARTPLUG"
      },
      {
          "DeviceId": "ID_THERMOSTAT"
      }
    ]
}
```

FIG.6

CSRequestPowerControl
- Individual Device Control : Device Power or Thermostat Temperature Setting
- CMD_ID : CMD_VALUE_POWER_CONTROL_REQUEST = 6

| | Description | JSON Example : Gear To Mobile |
|---|---|---|
| Power On/Off | Forward ID and Power State of Device to be Controlled | {<br>"CMD_ID": 6,<br>"DEV_LIST": [<br>{<br>"DevicePowerState": "POWERSTATE_ON",<br>"DeviceId": "ID_LED"<br>}<br>]<br>} |
| Thermostat Setting | Forward ID and Setting Value of Device to be Controlled<br><br>SET DevicePowerState to POWERSTATE_DETAIL | {<br>"CMD_ID": 6,<br>"DEV_LIST": [<br>{<br>"DevicePowerState": "POWERSTATE_DETAIL",<br>"DeviceId": "ID_THERMOSTAT",<br>"DevicePowerStateDetailValue": "76"<br>}<br>]<br>} |

FIG.7

ParserCSResponseGetDeviceStatusList
- Inform Wearable Device of State of Connected Home Device After Executing
  CSRequestGetDeviceStatusList or CSRequestPowerControl
- CMD_ID : CMD_VALUE_SEND_DEVICE_STATUS = 3

```
JSON Example : Mobile To Gear

{
    "CMD_ID": 3,
    "DEV_LIST": [
      {
          "DevicePowerState": "POWERSTATE_OFF",
          "DeviceId": "ID_LED"
      },
      {
          "DevicePowerState": "POWERSTATE_OFF",
          "DeviceId": "ID_DOORLOCK"
      },
      {
          "DevicePowerState": "POWERSTATE_OFF",
          "DeviceId": "ID_SMARTPLUG"
      },
      {
          "DevicePowerState": "POWERSTATE_DETAIL",
          "DeviceId": "ID_THERMOSTAT",
          "DevicePowerStateDetailValue": "76"
      }
    ]
}
```

FIG.8

ParserCSNotificationMotionEventDetected
- When Motion Is Detected, Terminal Transmits Still Cut of
  IP Camera to Wearable Device
- CMD_ID : CMD_VALUE_MOTIONEVENT_DETECTED_NOTIFICATION = 10

```
JSON Message : Terminal to Wearable Device
{
    "NOTI_EXTRA_DATA": Byte Type Image Data
}
```

FIG.9

CSRequestPowerControl - IP Camera Monitoring
- Wearable Device Requests Terminal to Monitor
  IP Camera After Identifying Still Cut.
- Terminal Executes Ip Camera Streaming When Receiving Request.
- CMD_ID : CMD_VALUE_MOTIONEVENT_DETECTED_NOTIFICATION = 6

```
JSON Message : Terminal to Wearable Device
{
   "CMD_ID": 6,
   "DEV_LIST": [
     {
        "DevicePowerState": "POWERSTATE_ON",
        "DeviceId": "ID_IPCAM"
     }
   ]
}
```

FIG.10

Mode Selecting

Dimming Control

Device Selecting

Device Control (On/Off)
Slide Control (Page)

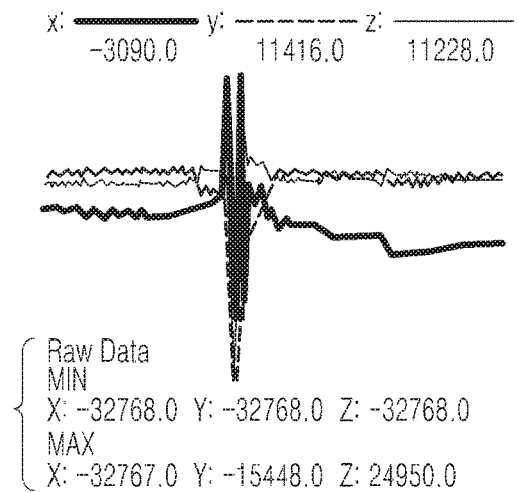
FIG.13A
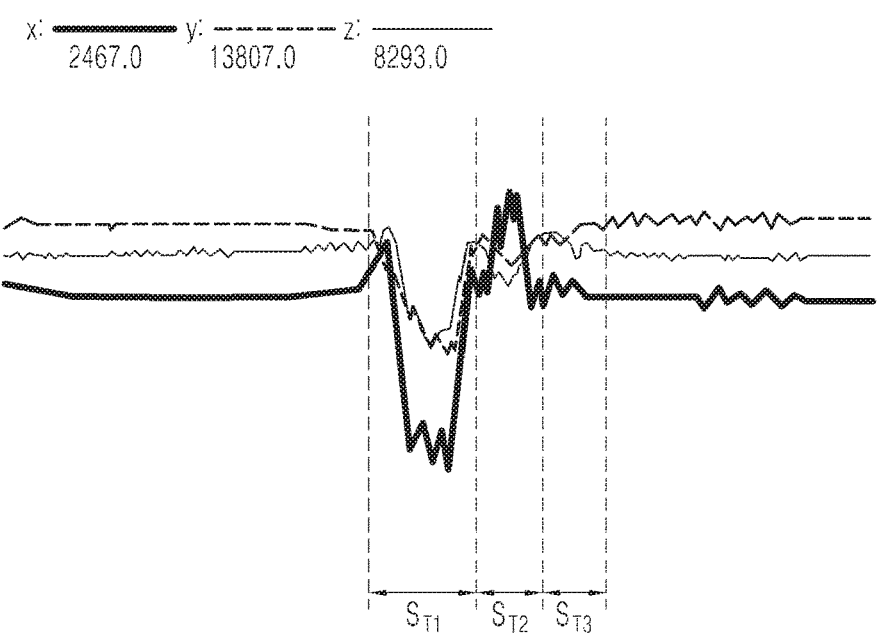
FIG.13B

HOME DEVICE CONTROL APPARATUS AND CONTROL METHOD USING WEARABLE DEVICE

PRIORITY

This application is a National Phase Entry of PCT International Application No. PCT/KR2015/000101, which was filed on Jan. 6, 2015, and claims a priority to Korea Patent Application No. 10-2014-0001567, which was filed on Jan. 6, 2014 and Korea Patent Application No. 10-2014-0151603, which was filed on Nov. 3, 2014, the contents of which are incorporated herein by reference.

TECHNICAL FIELD

The present invention relates to an apparatus and method for controlling a home device using a wearable device.

BACKGROUND ART

A home network system refers to a system that connects home devices installed in a house through a wired or wireless network to make communication between the home devices possible. An advanced home network system integrates home devices through a home gateway (HGW or H-GW) to connect them with an external common data network, for example, an Internet Protocol (IP) network (i.e., Internet), thereby providing a variety of services associated with the Internet. The home network system may control the home devices according to a user's demand to provide the variety of services desired by the user.

A technology for controlling legacy home appliances (e.g., home devices) using a terminal, such as a smart phone, in a wireless environment exists, but a user input to the terminal is indispensably required.

Accordingly, a technology for controlling home devices using another device other than a terminal is required.

DETAILED DESCRIPTION OF THE INVENTION

Technical Problem

The present invention provides an apparatus and method for controlling a home device using a wearable device.

The present invention provides an apparatus and method for controlling a home device through a user's voice and touch by using a wearable device.

The present invention provides an apparatus and method for controlling a home device using a wearable device inside and outside the house.

Technical Solution

A terminal for controlling a home device using a wearable device that can be worn on a user's body, according to an embodiment of the present invention, includes: a reception unit that receives a control signal generated based on the motion of the wearable device from the wearable device; and a controller that determines the sensor value of a corresponding location based on the control signal, determines a probability value based on the sensor value, compares the probability value with a threshold value, and determines whether to perform a control command for controlling the home device according to the comparison result.

A method of controlling, by a terminal, a home device using a wearable device that can be worn on a user's body, according to an embodiment of the present invention, includes: receiving a control signal generated based on the motion of the wearable device from the wearable device; determining a sensor value based on the control signal; determining a probability value based on the sensor value; and comparing the probability value with a threshold value and determining whether to perform a control command for controlling the home device according to the comparison result.

A wearable device that can be worn on a user's body, according to an embodiment of the present invention, includes: a motion detection sensor that recognizes the motion of the wearable device; and a controller that generates a control signal according to the motion detected by the motion detection sensor and transmits the control signal to a terminal.

A method of controlling a home device by a wearable device that can be worn on a user's body, according to an embodiment of the present invention, includes: recognizing the motion of the wearable device; generating a control signal according to the motion; and transmitting the control signal to a terminal.

Advantageous Effects

The present invention can control a home device using a wearable device.

The present invention can control a home device through a voice input to a wearable device.

The present invention can control a home device inside and outside a house through a wearable device.

The present invention can control a home device inside and outside a house through a user touch interface of a wearable device.

The present invention can control a home device inside and outside a house through a wearable device that recognizes a snap.

BRIEF DESCRIPTION OF THE DRAWINGS

FIG. 6 illustrates the format of a CSRequestGetDeviceStatusList message, according to an embodiment of the present invention;

FIG. 7 illustrates the format of a CSRequestPowerControl message, according to an embodiment of the present invention;

FIG. 8 illustrates the format of a ParserCSResponseGetDeviceStatusList message, according to an embodiment of the present invention;

FIG. 9 illustrates the format of a ParserCSNotification-MotionEventDetected message, according to an embodiment of the present invention;

FIG. 10 illustrates the format of a CSRequestPowerControl-IP Cam Power on message, according to an embodiment of the present invention;

FIG. 13 is a view illustrating acceleration and variations in X, Y, and Z axis sensor values of a gyro sensor;

MODE FOR CARRYING OUT THE INVENTION

Figure 1:
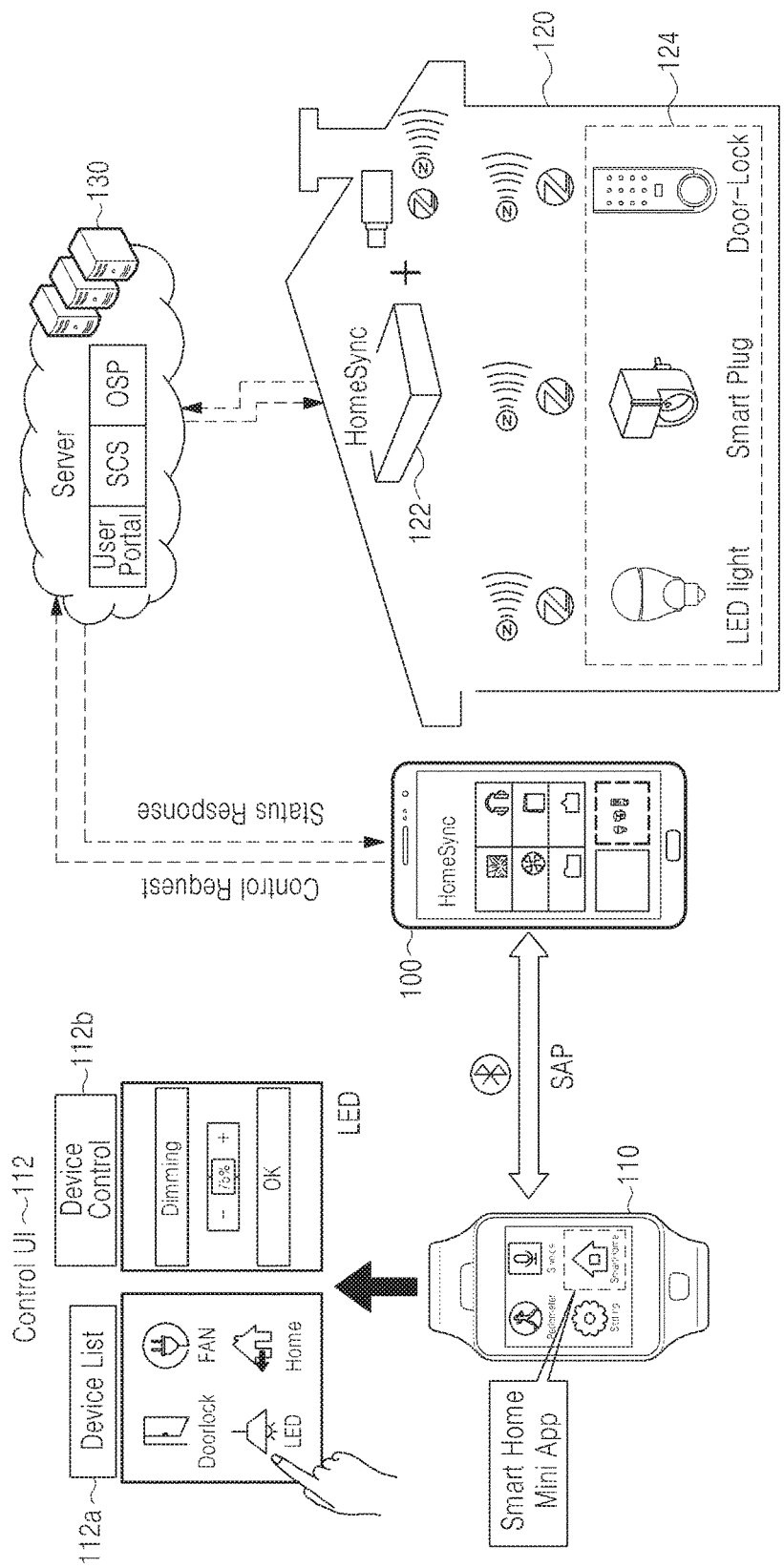
FIG. 1 is a diagram illustrating a schematic structure of a system for controlling a home device, according to an embodiment of the present invention.

Hereinafter, exemplary embodiments of the present invention will be described in detail with reference to the accompanying drawings. The same elements will be designated by the same reference numerals although they are shown in different drawings. Further, a detailed description of a known function and configuration which may make the subject matter of the present invention unclear will be omitted.

Further, terms or words used in the description and claims below should not be interpreted as only general or dictionary meanings, but interpreted as meanings and concepts satisfying the technical spirit of the present invention based on a principle in that the inventor can appropriately define his/her invention with a concept of the terms in order to describe the invention in the best method.

A home device, which will be hereinafter described, may be described interchangeably with a device.

FIG. 1 is a diagram illustrating a schematic structure of a system for controlling a home device, according to an embodiment of the present invention.

Referring to FIG. 1, the system for controlling a home device includes a terminal 100, a watch-type wearable device 110 (hereinafter, referred to as a "wearable device"), legacy home appliances 124 (e.g., a home device) in a house 120, a home gateway 122 in the house 120, an authentication server/device management server, and a remote routing management server 130 (hereinafter, referred to as a "server"), etc. The home devices 124 are located inside (or outside) the house and include smart appliances, security devices, lighting devices, energy devices, etc.

Examples of the smart appliances may include a smart TV, an Internet TV, a general TV, a refrigerator, a washing machine, a robot vacuum cleaner, etc. Examples of the security devices may include a door lock, a security camera, a security sensor, etc. Examples of the lighting devices may include a Light Emitting Diode (LED) lighting device, etc. Examples of the energy devices may include a power meter, a power socket, an electrical outlet, a multi-tap, etc. Additionally, examples of the home devices may include a Personal Computer (PC), an IP camera, an Internet telephone, a wired/wireless telephone, a mobile telephone in a house, etc.

The home devices 124 may be configured to: communicate with the home gateway 122 according to a wired or wireless communication scheme, receive a control command from the home gateway 122, and transmit required information corresponding to the control command to the home gateway 122. The home gateway 122 includes corresponding communication modules for communicating with the home devices 124 according to wired or wireless communication schemes. Further, the home gateway 122 may: register and back up information of the home devices 124; control the operations and states of the home devices 124, and collect required information from the home devices 124 to manage the same. In particular, the home gateway 122 may be connected to a data network (i.e., an IP network), such as the Internet, to allow another terminal's access through the Internet and forward a control signal received from the terminal to the corresponding home device.

The above-configured home network system may provide: a home entertainment service, such as an Internet TV (IPTV) service, a smart TV service, a Video on Demand (VoD) service, etc., through the Internet: a home data communication service, such as a data sharing service, an Internet telephone service (e.g., Voice over IP (VoIP)), and a video telephone service; and a home automation service, such as a remote control service for a home appliance, a remote meter reading service, a crime prevention service, and a disaster prevention service. Namely, the home network system connects and controls all types of home devices, which are used inside/outside the house, in a single network.

Meanwhile, a user may remotely access each home device through the home gateway, which is included in the home network system, by using wireless communication equipment, such as a terminal, outside the house. The terminal may be, for example, a Personal Digital Assistant (PDA), a smart phone, a mobile phone, a tablet computer, a notebook computer, or the like that has a communication function, and may access the home network system through an agent network and the Internet.

The wearable device 110, according to the embodiment of the present invention, refers to a device that can be worn by a user, and one or two wearable devices are required. The wearable device 110 refers to, for example, a watch-type phone, a watch-type device, a health bracelet, or the like, but may be diversely implemented without being limited thereto. The wearable device 110 includes, for example, a Galaxy gear, a fit, etc. of SAMSUNG ELECTRONICS Co. Ltd.

De facto ZigBee based on a home automation profile may be adopted between a home device and a gateway. The wearable device 110 and the terminal 100 are connected to each other using a Bluetooth (BLE) based protocol (e.g., a Samsung Accessory Protocol). The terminal 100 is connected to the server 130, which enables the terminal 100 to control the home devices 124 directly or through the home gateway 122 in the house 120.

The wearable device 110 detects a user's motion and generates a control signal according to the detected motion. The motion includes at least one of a snap, a gesture pattern, and rotation. The control signal refers to a signal for controlling a home device through the wearable device 110 and the terminal 100, or a signal for directly controlling the wearable device 110 and a home device. The control signal may be generated in a variety of formats according to a communication scheme between the wearable device 110 and the terminal. Examples of the communication scheme between the wearable device 110 and the terminal may include ZigBee, Wi-Fi, Bluetooth, Near Field Communication (NFC), a second generation (2G) or third generation (3G) cellular communication system, 3rd Generation Partnership Project (3GPP), Long Term Evolution (LTE), World Interoperability for Microwave Access (WiMAX), etc.

The home devices 124 are connected to the home gateway 122 by a wired or wireless communication scheme. The home gateway 122 may access a wired network, such as the Internet. Meanwhile, the registered terminal 100 may access a wireless network that includes a wireless access network and a provider core network, and may access the home gateway 122 through a wired network. The wireless network may be a second generation (2G) or third generation (3G) cellular communication system, 3rd Generation Partnership Project (3GPP), a 4G communication system, Long Term Evolution (LTE), World Interoperability for Microwave Access (WiMAX), etc.

In FIG. 1, the terminal 100 may access the home gateway 122 through the server 130. The server 130 provides an authentication number to the home gateway 122 and stores the unique number of the maker of the home gateway, etc. Furthermore, the server 130 performs a management operation to allow the terminal and the home gateway to communicate with each other when the authentication number of the terminal agrees with that of the gateway.

Figure 2:
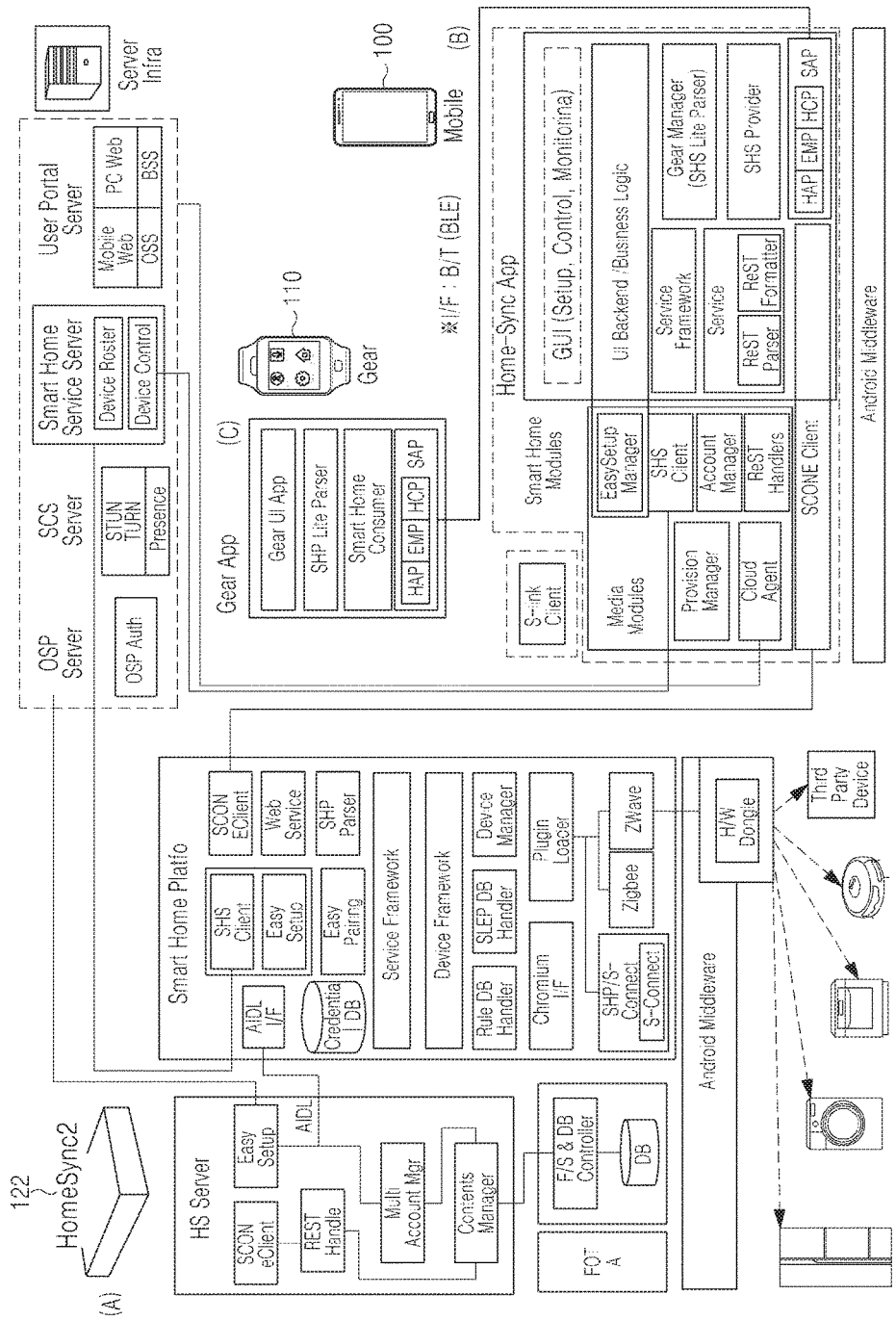
FIG. 2 is a diagram illustrating a detailed structure of the system for controlling a home device, according to an embodiment of the present invention.

FIG. 2 is a diagram illustrating a detailed structure of the system for controlling a home device, according to an embodiment of the present invention.

The system for controlling a home device includes: the home gateway (HomeSync) 122 that serves as a gateway in a house; the terminal 100 that serves as a delegator between a watch-type device and the home gateway; and the wearable device 110 having the structure of a watch-type device.

A home device performs a preliminary procedure of connecting with a home network system (for example, the terminal 100) when being first installed inside (or outside) the house. In this case, the terminal 100 acquires and stores device information on the newly purchased home device and user information on a peer ID, a peer group ID, a country code, etc.

The device information on the home device includes, for example, the type, the name, the description, the manufacturer, the model ID, the serial number, the sale location, the version, etc. of the home device, in addition to the Unique User Identifier (UUID) that is the unique ID of the home device. The peer group ID indicates a group of home devices that have been registered in a service server by using specific user accounts, and the country code indicates information on the country where the user of the terminal 100 is located.

The terminal 100 is a device that the user uses in order to identify the state of the home device or control the home device, and may be, for example, a mobile terminal (e.g., a smart phone, etc.), a tablet PC, or the like.

The home device 124 is located inside (or outside) the house, and can be controlled by a control device 160. The home device 124 includes a smart appliance, a security device, a lighting device, an energy device, etc. For example, the home device may be a television, an air conditioner, a refrigerator, a washing machine, a robot vacuum cleaner, a humidifier, etc. The security device may be a door lock, a security camera, a Closed Circuit Television (CCTV), a security sensor, etc. The lighting device may be a Light Emitting Diode (LED), a lamp, etc. The energy device may be a heating device, a power meter, a power socket, an electrical outlet, a multi-tap, etc. Additionally, the home device 124 may include a Personal Computer (PC), an IP camera, an Internet telephone, a wired/wireless telephone, an electrically controlled curtain, a blind, etc.

The user may access the service server using an application, for example a smart home application, which is executed in the terminal 100, to register home device information, or view or delete pre-registered home device information, and register control information for overall control of home devices, or view or delete pre-registered control information.

Figure 3:
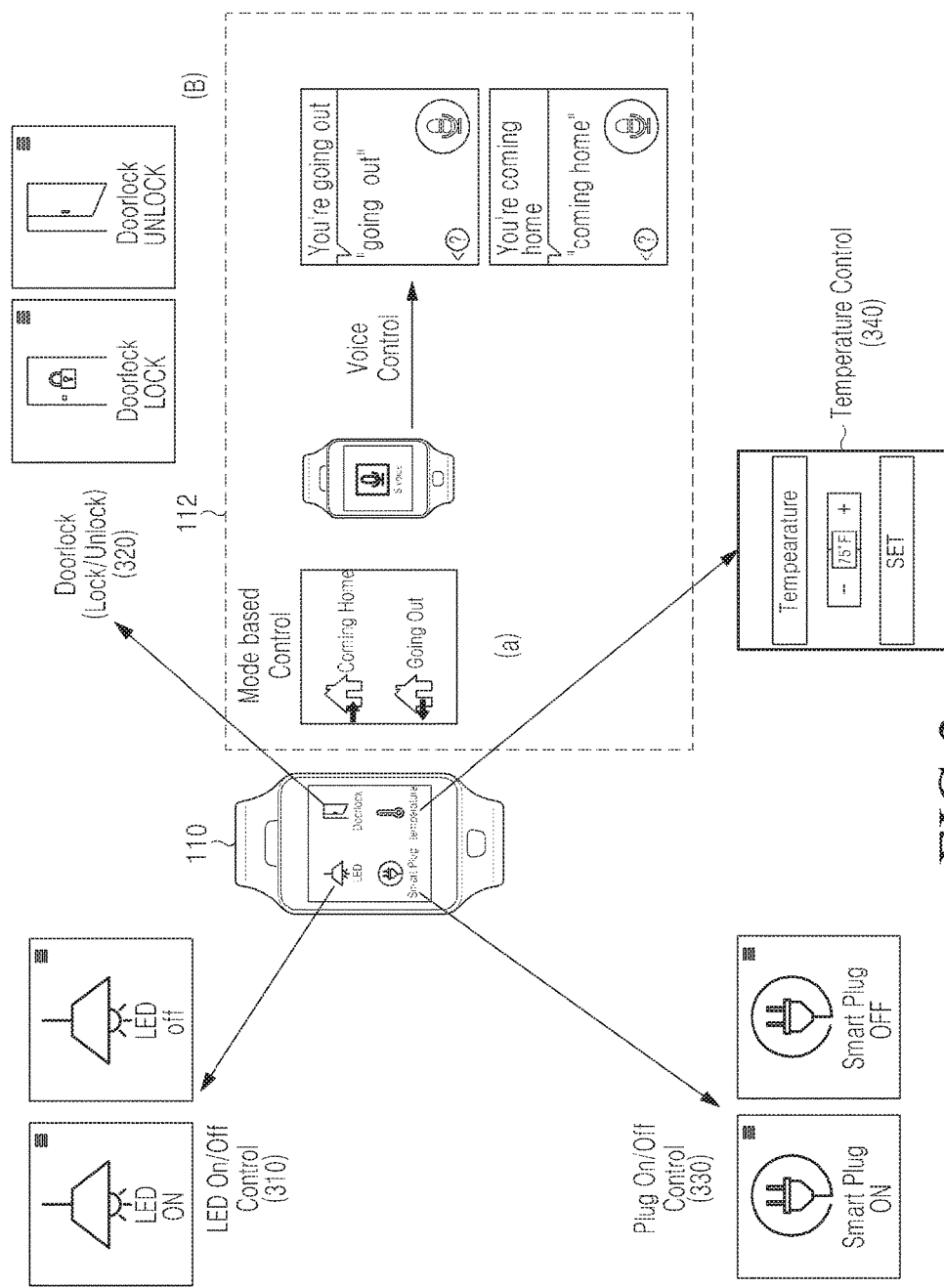
FIG. 3 illustrates a user interface of a wearable device for controlling a home device, according to an embodiment of the present invention.

FIG. 3 illustrates a user interface of a wearable device for controlling a home device, according to an embodiment of the present invention.

A list of controllable home devices is loaded on the initial screen of the wearable device 110 as illustrated in FIG. 3. The home device list of FIG. 3 includes, for example, LED on/off control 310, door lock on/off control 320, plug on/off control 330, temperature control 340, etc.

The state of each home device, such as power-on/off, may be identified through the user interface for controlling a home device. Further, when a user touches a device on the user interface for controlling a home device, the on/off state thereof is toggled. In the case of a thermostat that requires detailed control, when the user selects the corresponding device, a detailed control user interface of the corresponding device is loaded in order to perform control, such as setting temperature.

A first embodiment of the present invention supports a mode based user touch interface method as illustrated in FIG. 3 (A). In a case where "Coming Home Mode" is selected in an embodiment of the present invention, the wearable device 110 may control to turn on all or some of the currently connected (controllable) home devices. In a case where "Away Mode" or "Going out Mode" is selected in an embodiment of the present invention, the wearable device 110 may control to turn off all or some of the home devices.

In the second embodiment of the present invention, the wearable device 110 may receive the user's voice input to execute the corresponding mode as illustrated in FIG. 3 (B), and the execution result for the corresponding mode is the same as that in the user touch interface method.

Figure 4:
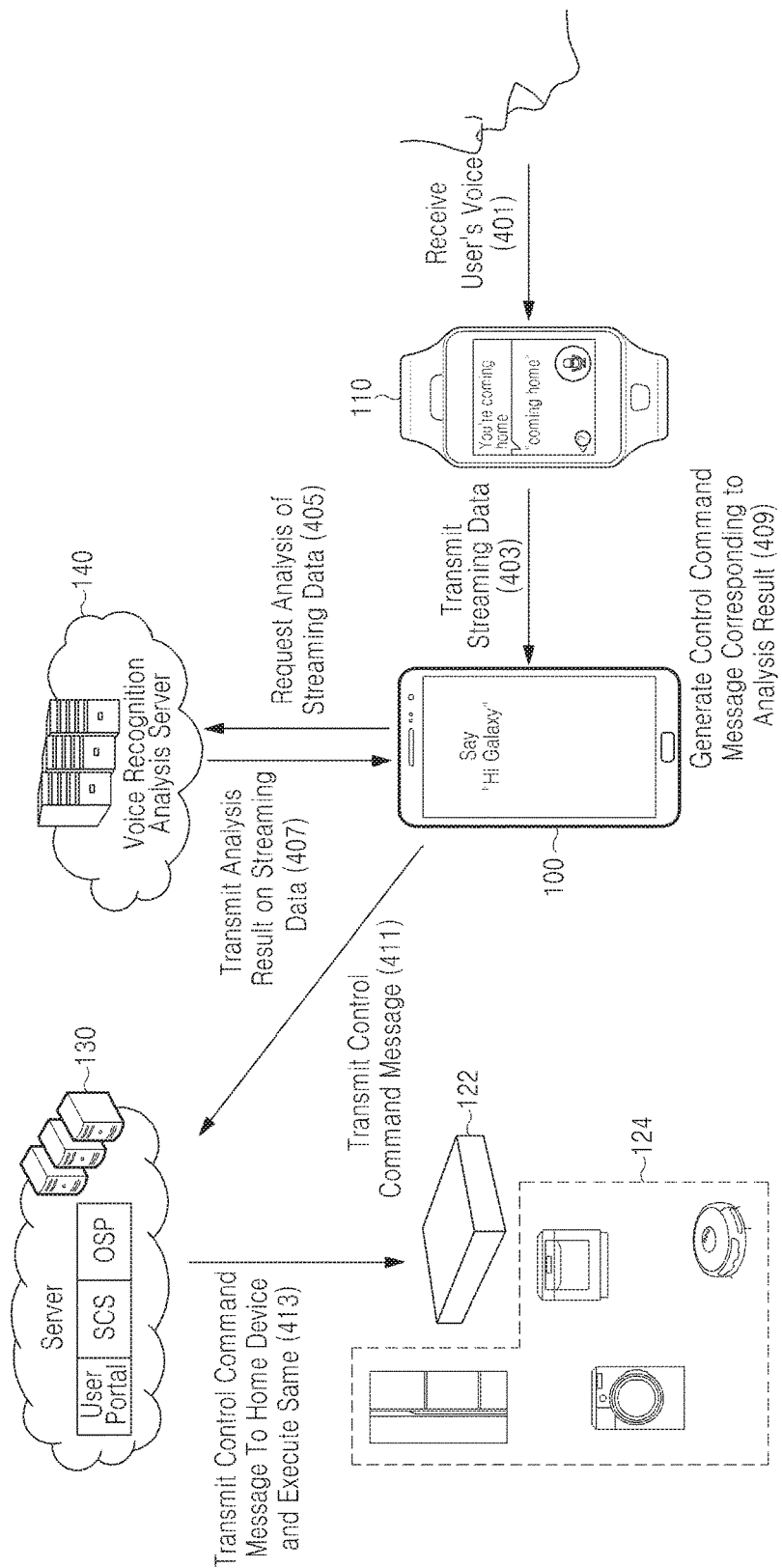
FIG. 4 is a flow diagram illustrating a method of controlling a home device using a wearable device, according to a second embodiment of the present invention.

FIG. 4 is a flow diagram illustrating a method of controlling a home device using a wearable device, according to a second embodiment of the present invention.

In step 401, the wearable device 110 receives a user's voice. In step 403, the wearable device 110 converts the received user's voice into streaming data and transmits the converted streaming data to the terminal 100. In step 405, the terminal 100 transmits a message for requesting the analysis of the streaming data to a voice recognition analysis server 140. The voice recognition analysis server 140 analyzes/interprets the streaming data and transmits the analysis result on the streaming data to the terminal 100 in step 407. The terminal 100 generates a control command message corresponding to the analysis result in step 409. For example, when the analysis result corresponds to "Coming Home Mode," the terminal 100 generates a control command message that includes the "Coming Home Mode." For example, when the analysis result corresponds to "Away Mode" or "Going out Mode," the terminal 100 generates a control command message that includes the "Away mode" or "Going out Mode."

In step 411, the terminal 100 transmits the generated control command message to the server 130. When receiving the control command message, the server 130 performs an authentication procedure and then transmits the control command message to a home device through the home gateway in step 413. Then, the home device is turned on/off according to the control command message.

Figure 5:
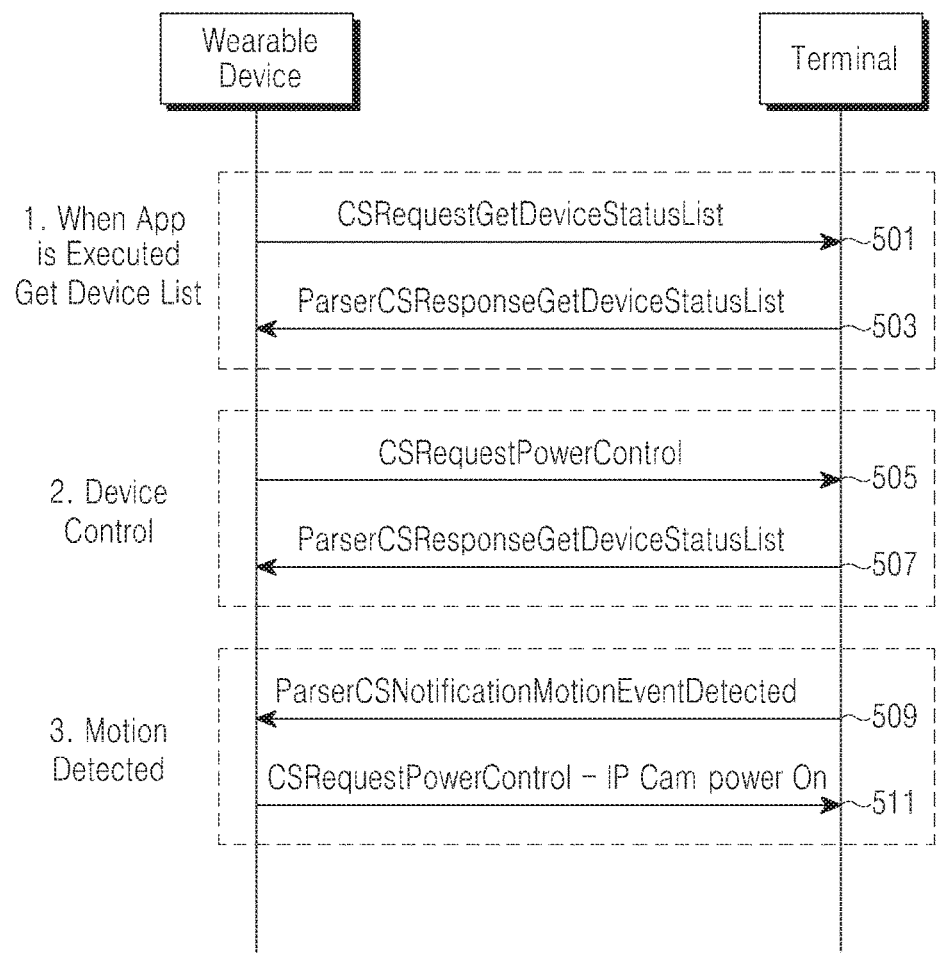
FIG. 5 is a flow diagram illustrating an operating procedure of a mode based user touch interface method according to a first embodiment of the present invention.
Figure 11A:
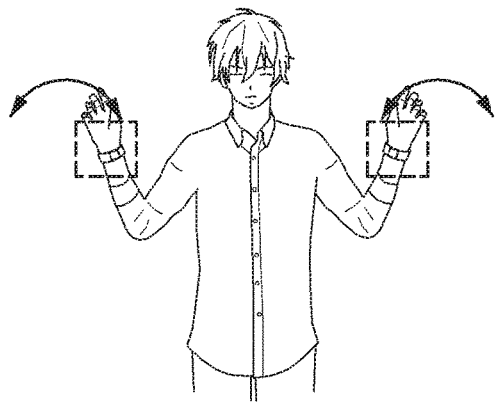
FIG. 11 is a scenario illustrating a gesture-recognition based home device control method, according to a third embodiment of the present invention.
Figure 11B:
Figure 11C:
Figure 11D:

FIG. 5 is a flow diagram illustrating an operating procedure of the mode based user touch interface method according to the first embodiment of the present invention.

In step 501, the wearable device transmits a CSRequestGetDeviceStatusList message to the terminal.

FIG. 6 illustrates the format of the CSRequestGetDeviceStatusList message, according to an embodiment of the present invention.

The CSRequestGetDeviceStatusList message is a device list response request message and is transmitted from the wearable device to the terminal. For example, the device list response request message includes IDs of home devices, such as an LED, a door lock, a smart plug, a thermostat, etc., and the IDs of the home devices, such as the LED, the door lock, the smart plug, the thermostat, etc. are displayed on a user interface.

In step 503, the terminal transmits a ParserCSResponseGetDeviceStatusList message to the wearable device. The CSRequestGetDeviceStatusList message and the ParserCSResponseGetDeviceStatusList message correspond to a controllable-device list request message transmitted to the terminal and a response message for the request message, respectively.

In step 505, the wearable device transmits a CSRequestPowerControl message to the terminal.

FIG. 7 illustrates the format of the CSRequestPowerControl message.

The CSRequestPowerControl message includes "Power On/Off" and "Thermostat Setting" in order to individually control the home devices.

First, the "Power On/Off" forwards the ID and power state of a home device to be controlled. The ID and power state of the home device to be controlled is displayed on a user interface as illustrated in FIG. 7.

The "Thermostat setting" forwards the ID and power state of the home device to be controlled and sets the device power state to, for example, "detailed power control" because detailed power control is required. As illustrated in FIG. 7, not only is the ID and power state of the home device to be controlled displayed on the user interface, but so also is the device power state that is set to "detailed power control (e.g., being controlled to 76 degrees)."

In step 507, the terminal transmits a ParserCSResponseGetDeviceStatusList message to the wearable device. FIG. 8 illustrates the format of the ParserCSResponseGetDeviceStatusList message, according to an embodiment of the present invention.

The ParserCSResponseGetDeviceStatusList message informs the wearable device of the state of the connected home device after executing the CSRequestGetDeviceStatusList message or CSRequestPowerControl message.

For example, in a case where CMD_ID=CMD_VALUE_SEND_DEVICE_STATUS is 3, the ParserCSResponseGetDeviceStatusList message informs, as illustrated in FIG. 8, the wearable device that the LED is in a power off state, the door lock is in a power off state, the smart plug is in a power off state, and the thermostat is in a detailed power control state (e.g., being controlled to 76 degrees).

The CSRequestPowerControl message and ParserCSResponseGetDeviceStatusList message represent control (On/Off, etc.) command transmission and state response message for a particular device.

In step 509, the terminal transmits a ParserCSNotificationMotionEventDetected message to the wearable device.

FIG. 9 illustrates the format of the ParserCSNotificationMotionEventDetected message, according to an embodiment of the present invention.

Referring to FIG. 9, when a motion is detected, the terminal transmits a still cut of an IP camera to the wearable device.

In step 511, the wearable device transmits a CSRequestPowerControl-IP Cam Power on message to the terminal.

FIG. 10 illustrates the format of the CSRequestPowerControl-IP Cam Power on message, according to an embodiment of the present invention.

The wearable device requests monitoring of the IP camera from the terminal after identifying the still cut. The terminal, when receiving the request, executes IP camera streaming.

The ParserCSNotificationMotionEventDetected message and CSRequestPowerControl-IP Cam Power on message represent messages for executing alerting, such as popup, etc., in the case of a state information response for a particular device.

FIG. 11 is a scenario illustrating a gesture-recognition based home device control method, according to a third embodiment of the present invention.

The third embodiment of the present invention proposes a method of controlling a home device using a gesture, such as a snap of the wrist, with a wearable device. In this case, the home device may be controlled using a plurality of wearable devices. Namely, the third embodiment of the present invention uses, for example, the fact that sensor information may be received utilizing wearable devices that are worn on the left and right wrists.

FIGS. 11 (a) and (b) illustrate cases where two wearable devices are used, and FIGS. 11 (c) and (d) illustrate cases where one wearable device is used.

FIG. 11 (a) illustrates a case of selecting a mode, and a user takes a snap motion with his/her hands. The snap motion refers to a quick, short movement with a snap. Here, the user may perform mode switching, by shaking his/her hands, between a control mode for controlling a home device and a slide mode for controlling a slide page.

FIG. 11 (b) illustrates, for example, dimming control, and the user takes a rotation motion with his/her hands. A dimming level may be controlled by the rotation gesture. Here, adjusting the dimming level refers to adjusting the intensity of light.

FIG. 11 (c) illustrates a case of selecting a particular home device among home devices.

The case of FIG. 11 (c) may be used to select a particular device in the above-described control mode, and a target device to be controlled may be selected through a snap of the left wrist. For example, in a case where there are three home devices (e.g., an LED light, an electric fan, and a television), the home devices may be sequentially selected in the order of the LED light, the electric fan, and the television by the repetition of the snap.

FIG. 11 (d) illustrates a case of controlling a device, and the user makes a snap motion, for example, with the left hand only. Here, the controlling of the device refers to, for example, turning on/off an LED light, a door lock, or a smart plug, or controlling a thermostat. In FIG. 11 (d), in a case where a selected home device is an LED light, the dimming (brightness) of the LED light may be adjusted using the value of the rotation axis, such as X or Y axis, of the wrist on which a wearable device is worn, in addition to a snap.

In FIG. 11 (d), the user makes a snap motion with the right hand only. In a case where a target home device has been selected, the on/off of the device may be controlled through the snap, and in a slide mode, a movement to the next slide may be controlled through the snap.

Figure 12:
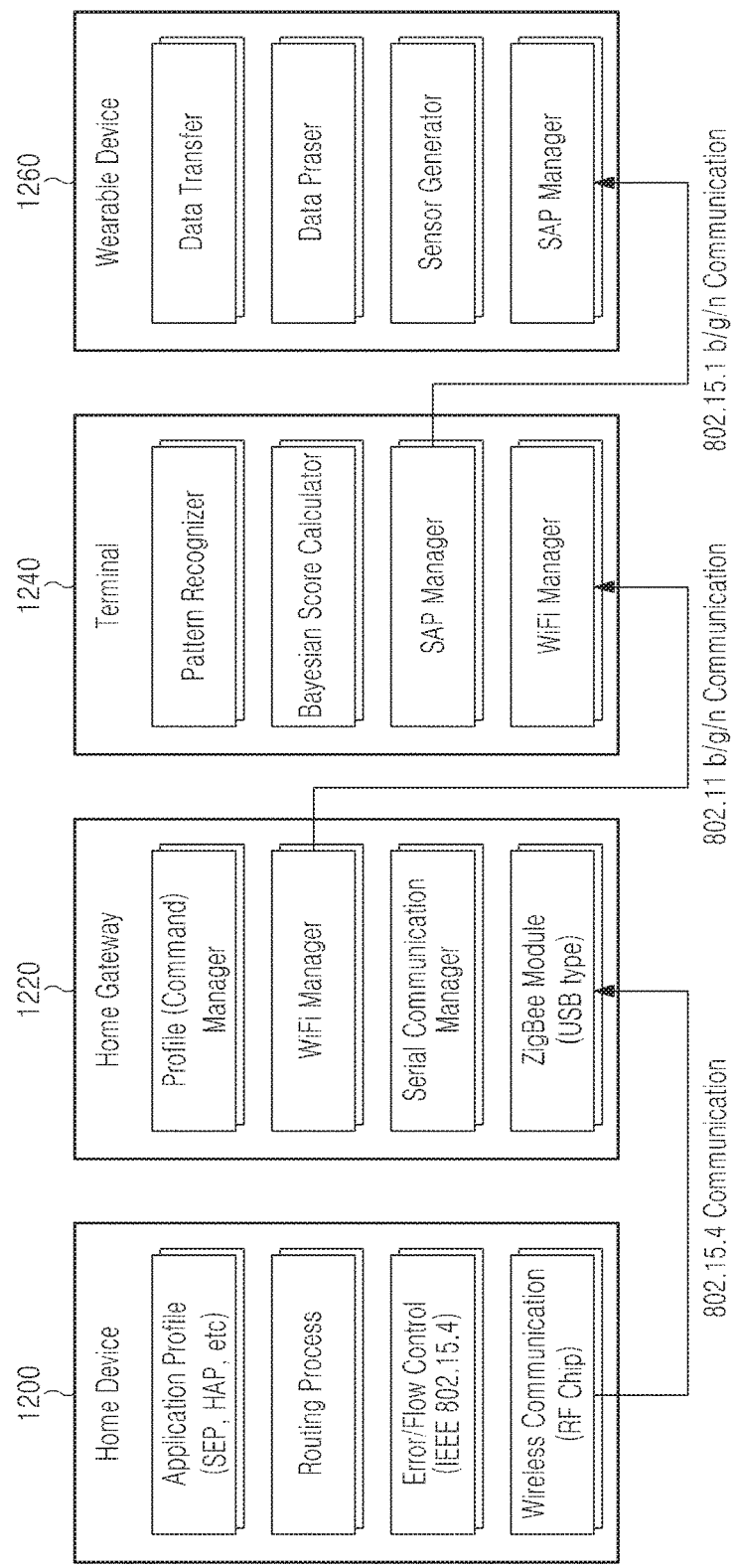
FIG. 12 is a block diagram illustrating the structure of a system according to an embodiment of the present invention.

FIG. 12 is a block diagram illustrating the structure of a system according to an embodiment of the present invention.

The system for controlling a home device based on a gesture, according to the third embodiment of the present invention, includes at least one home device 1200 (hereinafter, referred to as the "home device"), a home gateway 1220, a terminal 1240, a wearable device 1260, etc.

In FIG. 12, communication schemes between the home device 1200, the home gateway 1220, the terminal 1240, and the wearable device 1260 are illustrated as 802.15.4, 802.11b/g/n, 802.15.1, etc., but a variety of communication schemes may be applied without being limited thereto.

The wearable device 1260 generates a control signal based on a user's gesture pattern motion, snap, rotation, etc. and transmits the generated control signal to the terminal 1240.

The terminal 1240 receives the control signal from the wearable device 1260 and determines whether to execute a corresponding control command based on a predetermined threshold value to transmit the corresponding control command to the home gateway 1220.

The terminal 1240 transmits the control command to the home device when the comparison result shows that a probability value is greater than, or equal to, the threshold value, and does not perform the control command when the probability value is less than the threshold value.

The home gateway 1220 receives the control command from the terminal 1240 and transmits a control command to perform a conversion into a network protocol that the home device can finally recognize and control the home device.

The home device 1200 receives the control command and processes and executes the same.

Whether the terminal specifies a threshold value based on the pattern of a corresponding gesture is determined, as illustrated in FIG. 13, by using a probability pattern analysis method based on an algorithm for recognizing a gesture, for example, a Bayesian estimation algorithm.

FIG. 13 (a) illustrates an ordinary gesture pattern, and FIG. 13 (b) illustrates acceleration and variations in X, Y, and Z axis sensor values of a gyro sensor.

In the Bayesian estimation algorithm, according to an existing event or non-occurring event, the probability (value) for the corresponding event may be estimated based on a previous distribution. In particular, it has been known that the Friedman technique may be well used even in the case of an infinite event. A routing frequency between previous nodes is profiled, and the degree to which the current node is likely to occur, compared with a profile before a routing connection request, is calculated. When the calculation result shows that the request is for a node having a low probability, the request is determined to be an abnormal request.

The graph of acceleration sensor data generated during a snap motion for a gesture input is illustrated in FIG. 13. As illustrated in FIG. 13 (b), variations in sensor values may be divided into $S_{T1}$, $S_{T2}$, and $S_{T3}$ according to time.

An abnormal value is calculated by extracting values corresponding to the three fields, defining ABC, ABD, EFH, etc. as a single sampled value, like $S_{T1}$ (A), $S_{T2}$ (B), and $S_{T3}$ (C), based on the extracted values, and measuring a frequency. The abnormal value is calculated through the following process.

First, C (D, L) is calculated by Equation 1 below.

C (D, L) denotes a scaling factor (i.e., the number of all observable samples).

P denotes the probability value of a sample to be observed.

$$C(D, L) = \sum_{k=k^0}^{L} \frac{k^0 \alpha + N}{K\alpha + N} P(k|D)$$ [Equation 1]

$$P(X^{N+1} = i|D) = (\frac{\alpha + N_i}{K^0 + N}) C(D, L)$$

In Equation 1 above, N denotes the number of all samples to be observed (the number of times that a sensor value of AB occurs).

K denotes the number of different types of events to be observed (a frequency of AB in the previous training).

Alpha (α) denotes a user defined value.

L denotes the number of all samples to be observed (the number of possible nodes).

$P(X^{N+1}=i|D)$ is estimated based on training data.

X denotes a sample (sensor value—ABC) to be observed.

Ni denotes the number of times that a particular event has occurred (AB→the number of times that a sensor value of C has occurred).

P in Equation 1 may be expressed as Equation 2.

$$P(X = i) = \frac{C(N_i + \alpha)}{K\alpha + N}\left(C = \frac{N}{N + L - K}\right)$$ [Equation 2]

Figure 14:
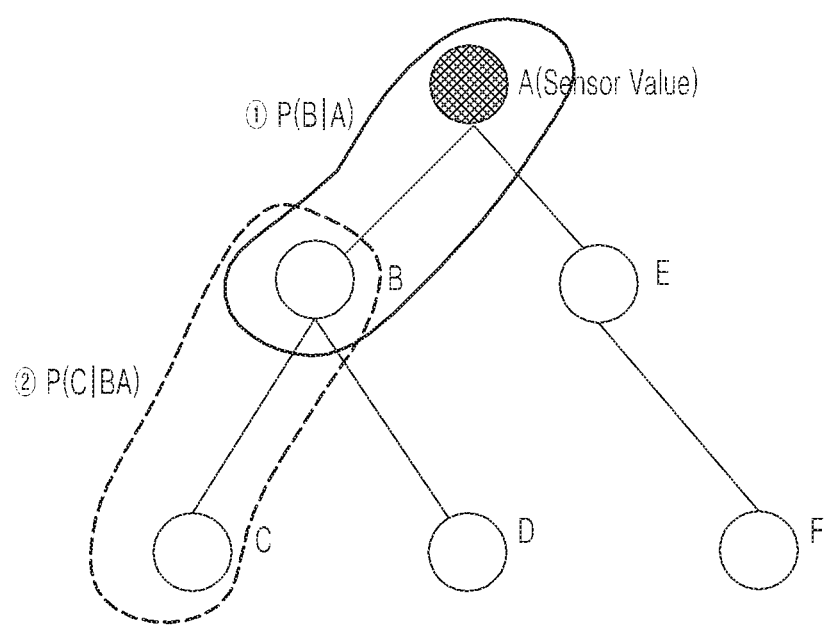
FIG. 14 is a diagram illustrating a method of calculating an abnormal value, according to an embodiment of the present invention.

FIG. 14 is a diagram illustrating a method of calculating an abnormal value, according to an embodiment of the present invention.

The method of calculating an abnormal value, according to the embodiment of the present invention, is as follows. For example, on a sensor data generation graph illustrated in FIG. 14, a sensor generation value (or sensor value) of A may be displayed as the following sensor generation value graph.

Sensor values of samples may be, for example, A-B-C, A-E-F, A-B-D, and A-B-C as illustrated in FIG. 14.

Figure 15:
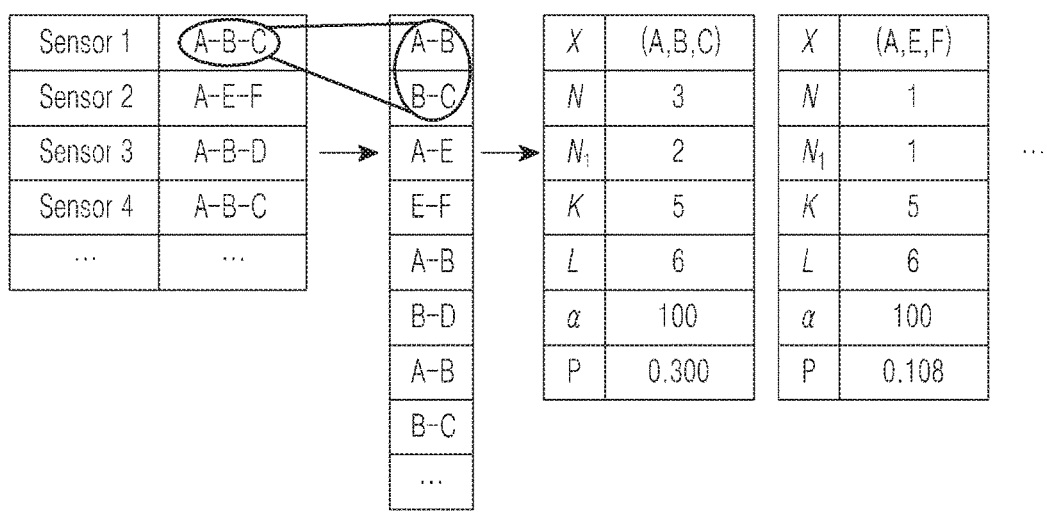
FIG. 15 is a view illustrating an abnormal-value table calculating method, according to an embodiment of the present invention.

FIG. 15 is a view illustrating an abnormal-value table calculating method, according to an embodiment of the present invention.

P (ABC) abnormal value in the above-described example, namely, a probability that the sensor value C ($S_{T3}$) is likely to occur after the sensor values A ($S_{T1}$) and B ($S_{T2}$) is calculated as follows. After the structure of ABC is divided using 2-gram, the P value is calculated through Equation 2. The calculated P value is compared with an abnormal value (e.g., threshold value) on the existing profile, and when the comparison result shows that the P value is beyond a threshold value range, the P value is determined to be abnormal.

Figure 16:
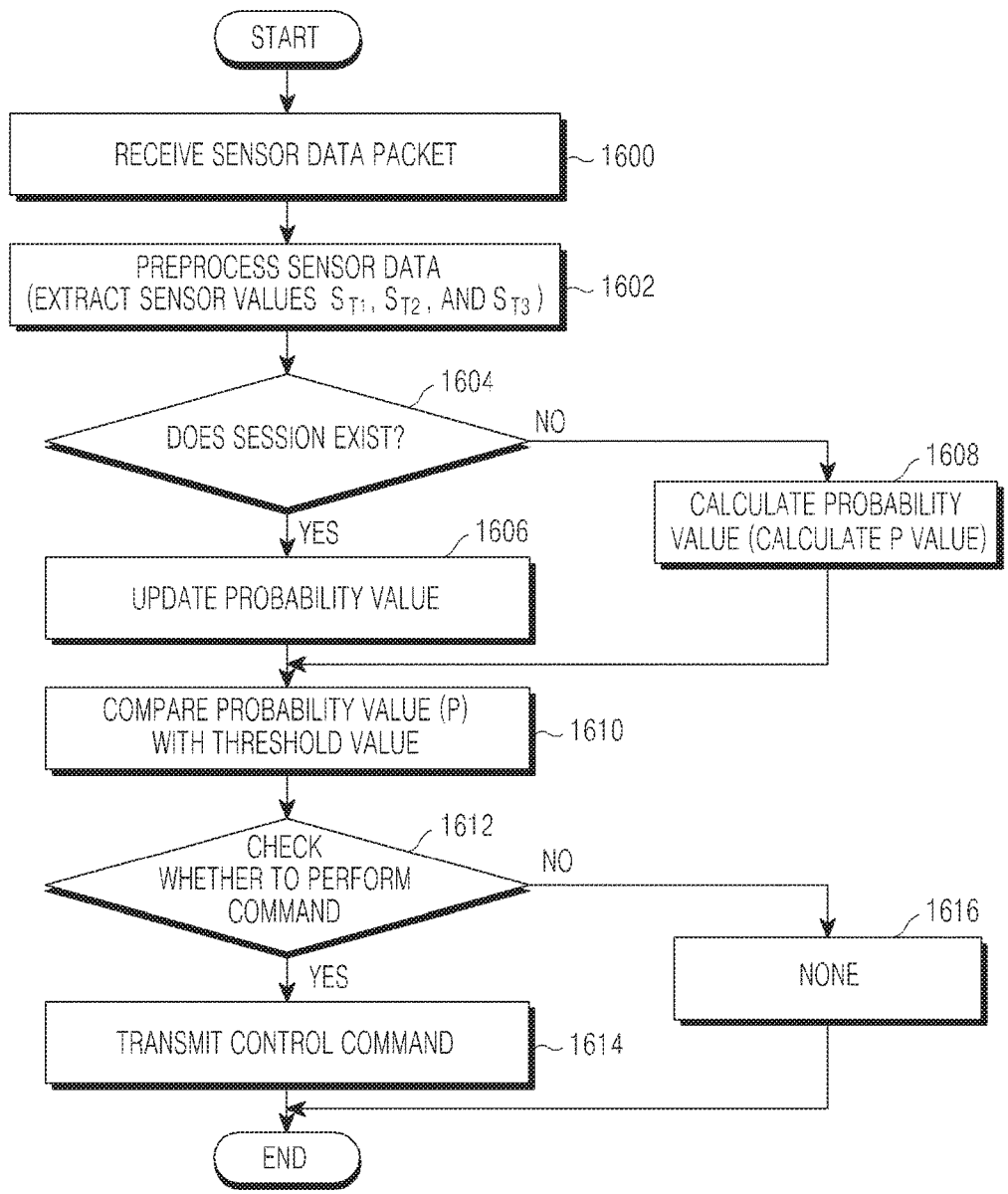
FIG. 16 is a flowchart illustrating the whole process of processing an agreement or disagreement of a gesture pattern and whether to transmit a control command through a Bayesian-type probability value calculation algorithm, according to an embodiment of the present invention.

FIG. 16 is a flowchart illustrating the whole process of processing the agreement or disagreement of a gesture pattern and whether to transmit a control command through a Bayesian-type probability value calculation algorithm, according to an embodiment of the present invention.

In step 1600, a terminal receives sensor information. The sensor information is received from a wearable device by using a snap of a user's wrist. In step 1602, the terminal extracts three fields $S_{T1}$, $S_{T2}$, and $S_{T3}$ from the sensor information.

In step 1604, the terminal determines whether a session exists on a profile. Step 1604 may be omitted. In a case where step 1604 is omitted, the terminal calculates a probability value and then proceeds to step 1610.

In a case where the session does not exist, the terminal proceeds to step 1608 to calculate a probability value to be generated and proceeds to step 1610.

However, in a case where the session exists, the terminal proceeds to step 1606 to update the probability value, and compares the probability value calculated in step 1608 with a threshold value. As a result of the comparison, the terminal checks whether to perform a command and a user interface in step 1612. When the terminal determines to perform the command and the user interface (when the probability value is greater than, or equal to, the threshold value), the terminal transmits a control command in step 1614. In contrast, when the terminal determines not to perform the command and the user interface (when the probability value is less than the threshold value), the terminal does not perform the generated data of a corresponding gesture pattern in step 1616.

Further, it can be seen that the home device control apparatus and method using a wearable device, according to the embodiment of the present invention, may be implemented in the form of hardware, software, or a combination thereof. Such arbitrary software may be stored, for example, in a volatile or non-volatile storage device (e.g., a ROM, etc.), a memory (e.g., a RAM, a memory chip, a memory device, or a memory IC), or a machine (e.g., computer) recordable optical or magnetic storage medium (e.g., a CD, a DVD, a magnetic disc, a magnetic tape, etc.) regardless of its ability to erase or rewrite. It can be seen that the home device control method using a wearable device, according to the embodiment of the present invention, may be implemented by a computer or terminal that includes a controller and a memory, and the memory is an example of a machine readable storage medium that is suitable for storing a program or programs that include instructions for implementing the embodiments of the present invention.

Accordingly, the present invention includes a program that includes a code for implementing the apparatus and method set forth in the appended claims of the specification and a machine (computer, etc.) readable storage medium for storing the program. Furthermore, the program may be electronically transferred by an arbitrary medium, such as a communication signal transmitted through a wired or wireless connection, and the present invention appropriately includes equivalents of the program.

In addition, the home device control apparatus using a wearable device, according to the embodiment of the present invention, may receive the program from a program providing device that is connected thereto in a wired or wireless manner, and may store the received program. The program providing device may include: a memory for storing a program that includes instructions for allowing a program processing device to perform a home device control method using a preset wearable device, information required for the home device control method using a wearable device, and the like; a communication unit for performing wired or wireless communication with a graphic processing device; and a controller that transmits a corresponding program to a transmission/reception device automatically or in response to a request of the graphic processing device.

Although the embodiment has been described in the detailed description of the present invention, the present invention may be modified in various forms without departing from the scope of the present invention. Therefore, the scope of the present invention should not be defined as being limited to the embodiments, but should be defined by the appended claims and equivalents thereof.

The invention claimed is:

1. A terminal for controlling a home device using a first wearable device and a second wearable device that can be worn on a body part of a user, the terminal comprising:
a communicator; and
at least one processor coupled to the communicator,
wherein the at least one processor is configured to:
establish a first connection with the first wearable device,
establish a second connection with the second wearable device,
establish a third connection with a gateway,
receive, from the first wearable device, a first control signal generated in a predetermined format through the first connection, the first control signal being generated based on one of a motion of the first wearable device, a voice of a user input to the first wearable device, or a touch of a user input to the first wearable device,
receive, from the second wearable device, a second control signal generated in a predetermined format through the second connection, the second control signal being generated based on one of a motion of the second wearable device, a voice of a user input to the second wearable device, or a touch of a user input to the second wearable device,
determine sensor values of locations corresponding to the first control signal and the second control signal,
determine probability values based on the sensor values,
compare each of the probability values with a threshold value,
generate a control command to control the home device according to a result of the comparison, and
transmit, to the gateway, the control command through the third connection.

2. The terminal of claim 1, wherein the motion comprises at least one of a snap, a gesture pattern, or a rotation.

3. The terminal of claim 1, wherein each of the probability values is determined by an Equation set forth below, $$P(X^{N+1} = i | D) = \left(\frac{\alpha + N_i}{K^0 + N}\right) C(D, L)$$

$$C(D, L) = \sum_{k=k^0}^{L} \frac{k^0 \alpha + N}{K\alpha + N} P(k | D),$$

where C (D, L) denotes a scaling factor,
P denotes a probability value of a sample to be observed,
N denotes a number of all samples to be observed,
K denotes a number of different types of observed events,
alpha (α) denotes a user defined value,
L denotes the number of all samples to be observed,
X denotes a sample to be observed,
Ni denotes a frequency of a particular event, and
$P(X^{N+1}=i|D)$ is estimated based on training data.

4. The terminal of claim 1, wherein the control command is transmitted to the home device when the result of the comparison determines that each of the probability values is greater than, or equal to, the threshold value.

5. The terminal of claim 1, wherein the control command is not performed when the result of the comparison determines that one of the probability values is less than the threshold value.

6. A method of controlling, by a terminal, a home device using a first wearable device and a second wearable device that can be worn on a body part of a user, the method comprising:
establishing a first connection with the first wearable device;
establishing a second connection with the second wearable device;
establishing a third connection with a gateway;
receiving, from the first wearable device, a first control signal in a predetermined format through the first connection, the first control signal being generated based on one of a motion of the first wearable device, a voice of a user input to the first wearable device, or a touch of a user input to the first wearable device;
receiving, from the second wearable device, a second control signal generated in a predetermined format through the second connection, the second control signal being generated based on one of a motion of the second wearable device, a voice of a user input to the second wearable device, or a touch of a user input to the second wearable device;
determining sensor values based on the first control signal and the second control signal;
determining probability values based on the sensor values;
comparing each of the probability values with a threshold value;
generating a control command for controlling the home device according to a result of the comparison; and
transmitting, to the gateway, the control command through the third connection, the control command being generated for the gateway to control the home device.

7. The method of claim 6, wherein the motion comprises at least one of a snap, a gesture pattern, or a rotation.

8. The method of claim 6, wherein each of the probability values is determined by an Equation set forth below, $$P(X^{N+1} = i \mid D) = \left( \frac{\alpha + N_i}{K^0 + N} C(D, L) \right)$$

$$C(D, L) = \sum_{k=k^0}^{L} \frac{k^0 \alpha + N}{K\alpha + N} P(k \mid D),$$

where C (D, L) denotes a scaling factor,
P denotes a probability value of a sample to be observed,
N denotes a number of all samples to be observed,
K denotes a number of different types of observed events,
alpha ($\alpha$) denotes a user defined value,
L denotes the number of all samples to be observed,
X denotes a sample to be observed,
Ni denotes a frequency of a particular event, and
$P(X^{N+1}=i \mid D)$ is estimated based on training data.

9. A system including a first wearable device and a second wearable device that can be worn on a body part of a user, each of the first wearable device and the second wearable device comprising:
a communicator;
at least one sensor configured to recognize one of a motion of the wearable device, a voice of the user input to the wearable device, or a touch of the user input to the wearable device; and
at least one processor coupled to the communicator,
wherein the at least one processor is configured to:
establish a first connection with a terminal,
generate a control signal according to one of the motion detected by the at least one sensor, a voice of the user detected by the at least one sensor, or a touch of the user detected by the at least one sensor, and
transmit, to the terminal, the control signal through the first connection for the terminal to transmit, to a gateway, a control command,
wherein the control command is generated by the terminal based on the control signal generated by the first wearable device and the control signal generated by the second wearable device,
whereby the terminal is configured to transmit, to the gateway, the control command to control a home device through a third connection and the third connection is established between the terminal and the gateway.

10. The system of claim 9, wherein the motion comprises at least one of a snap, a gesture pattern, or a rotation.

11. A method of controlling a home device by a first wearable device and a second wearable device that can be worn on a body part of a user, the method comprising:
establishing, by the first wearable device, a first connection with a terminal;
establishing, by the second wearable device, a second connection with the terminal;
recognizing, by the first wearable device, one of a first motion of the first wearable device, a first voice of a user input to the first wearable device, or a first touch of a user input to the first wearable device;
recognizing, by the second wearable device, one of a second motion of the second wearable device, a second voice of a user input to the second wearable device, or a second touch of a user input to the second wearable device;
generating, by the first wearable device, a first control signal according to one of the first motion, the first voice, or the first touch;
generating, by the second wearable device, a second control signal according to one of the second motion, the second voice, or the second touch;
transmitting, by the first wearable device, to the terminal, the first control signal through the first connection; and
transmitting, by the second wearable device, to the terminal, the second control signal through the second connection,
wherein a control command is generated by the terminal based on the first control signal and the second control signal,
whereby the terminal is configured to transmit, to a gateway, the control command to control a home device through a third connection and the third connection is established between the terminal and the gateway.

12. The method of claim 11, wherein each of the first motion and the second motion comprises at least one of a snap, a gesture pattern, or a rotation.

* * * * *